(12) United States Patent
Merrill et al.

(10) Patent No.: US 6,235,370 B1
(45) Date of Patent: May 22, 2001

(54) HIGH TEMPERATURE EROSION RESISTANT, ABRADABLE THERMAL BARRIER COMPOSITE COATING

(75) Inventors: Gary B. Merrill, Monroeville, PA (US); Jay A. Morrison, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/261,721

(22) Filed: Mar. 3, 1999

(51) Int. Cl.$^7$ ........................................................ B32B 3/12
(52) U.S. Cl. ................ 428/116; 29/888.025; 415/208.1; 416/224; 416/229 R; 416/229 A; 428/593
(58) Field of Search .................................. 415/200, 208.1; 29/888.025; 416/224, 229 R, 229 A; 428/116, 593

(56) References Cited

U.S. PATENT DOCUMENTS

| | | |
|---|---|---|
| 4,177,308 | 12/1979 | Beeler . |
| 4,405,284 | 9/1983 | Albrecht et al. . |
| 4,639,388 | 1/1987 | Ainsworth et al. . |
| 4,664,600 * | 5/1987 | Perry ..................................... 416/224 |
| 4,802,828 | 2/1989 | Rutz et al. . |
| 4,867,639 | 9/1989 | Strangman . |
| 4,916,022 | 4/1990 | Solfest et al. . |
| 5,064,727 | 11/1991 | Naik et al. . |
| 5,180,285 | 1/1993 | Lau . |
| 5,310,592 * | 5/1994 | Baker et al. ......................... 428/117 |
| 5,683,825 | 11/1997 | Bruce et al. . |
| 5,780,146 | 7/1998 | Mason et al. . |

FOREIGN PATENT DOCUMENTS

| | | |
|---|---|---|
| 0 751 104 A2 | 1/1997 | (EP) . |
| 1 556 274 | 11/1979 | (GB) . |
| 2 130 244 | 5/1984 | (GB) . |

* cited by examiner

*Primary Examiner*—Francis J. Lorin
(74) *Attorney, Agent, or Firm*—Eckert Seamans Cherin & Mellott, LLC

(57) ABSTRACT

A composite thermal barrier coating system includes a honeycomb metallic structure filled with high thermal expansion ceramic hollow spheres in a phosphate bonded matrix. The composite thermal barrier coating system may be manufactured to thicknesses in excess of current thermal barrier coating systems, thereby imparting greater thermal protection. Superior erosion resistance and abrasion properties are also achieved. The composite thermal barrier coating is useful on combustion turbine components such as ring seal segments, vane segment shrouds, transitions and combustors.

43 Claims, 3 Drawing Sheets

HIGH TEMPERATURE EROSION RESISTANT, ABRADABLE THERMAL BARRIER COMPOSITE COATING

FIELD OF THE INVENTION

The present invention relates to high temperature erosion resistant abradable composite coatings, and more particularly relates to the use of such coatings as thermal barriers in applications such as combustion turbine ring seal segments, vane segment shrouds, transitions and combustors.

BACKGROUND INFORMATION

Metal components of combustion turbines are operated at very high temperatures and often require the use of thermal barrier coatings (TBCs). Conventional TBCs typically comprise a thin layer of zirconia. In many applications, the coatings must be erosion resistant and must also be abradable. For example, turbine ring seal segments which fit with tight tolerances against the tips of turbine blades must withstand erosion and must preferentially wear or abrade in order to reduce damage to the turbine blades.

In order to provide sufficient adherence to the underlying metal substrate, conventional TBCs are provided as relatively thin layers, e.g., less than 0.5 mm. This thickness is limited by the thermal expansion mismatch between the coating and metallic substrate. However, such thin layers limit the heat transfer characteristics of the coatings, and do not provide optimal erosion resistance and abrasion properties.

The present invention has been developed in view of the foregoing, and to address other deficiencies of the prior art.

SUMMARY OF THE INVENTION

The present invention provides a high temperature, thermally insulating and/or abradable composite coating system that may be used in gas turbine components such as ring seal segments and the like. The preferred composite material comprises a metal base layer or substrate, a metallic honeycomb structure, and a ceramic filler material. The ceramic filler material comprises hollow ceramic spheres within a phosphate matrix to provide high temperature capability and excellent thermal insulation. The resulting system is compliant and accommodates differential thermal strains between the ceramic and the metallic substrate material. The honeycomb/ceramic composite may optionally be overlaid with a ceramic layer to protect and insulate the metallic honeycomb.

In addition to improved thermal properties, the present composite may also display excellent abradable properties if tailored accordingly. The honeycomb structure provides good adhesion between the ceramic material and the underlying metallic substrate/component. By infiltrating the ceramic into the cells of the honeycomb during processing, the honeycomb provides additional mechanical anchoring to enhance ceramic to metal adhesion. The composite enables the use of relatively thick insulating coatings, e.g., on the order of 2 mm or more, to provide very high temperature protection to metallic hot section gas turbine parts.

The material system in addition to providing adequate abradability also possesses excellent erosion resistance. For example, the ceramic on a ring seal segment should wear preferentially to the metal of a blade in the case of ring seal segment/blade tip rubbing. This property provides the capability to restrict blade tip clearances and to improve engine efficiencies without incurring the damage to blade tips that conventional TBC coatings cause in similar situations.

The present invention provides a more durable, cost effective thermal barrier coating system for use with ring seal segments, transitions, combustors, vane platforms, and the like. The coating can be applied to greater thicknesses than conventional TBCs, thereby offering increased temperature protection for substrate metal components. By employing the metallic honeycomb structure to adhere the ceramic coating to the metal substrates, increased compliance between the base metal and the ceramic is achieved, minimizing local stresses and increasing component life. Because the coating system can be applied in simple steps such as brazing, back-filling and heat treating, fabrication of the system may be accomplished much more cost effectively than electron beam physical vapor deposition of conventional zirconia based TBC coatings and comparable to air plasma sprayed coatings.

An aspect of the present invention is to provide a composite thermal barrier coating comprising a metal substrate, a metal support structure secured to the substrate, and a ceramic filler material at least partially inside the metal support structure comprising hollow ceramic particles in a ceramic matrix.

Another aspect of the present invention is to provide a method of making a composite thermal barrier coating. The method includes the steps of securing a metal support structure to a metal substrate, at least partially filling voids of the metal support structure with a ceramic filler material comprising hollow ceramic particles and a binder material, and heating the ceramic filler material to form a ceramic matrix connecting the hollow ceramic particles.

These and other aspects of the present invention will be more apparent from the following description.

DETAILED DESCRIPTION

Figure 1:
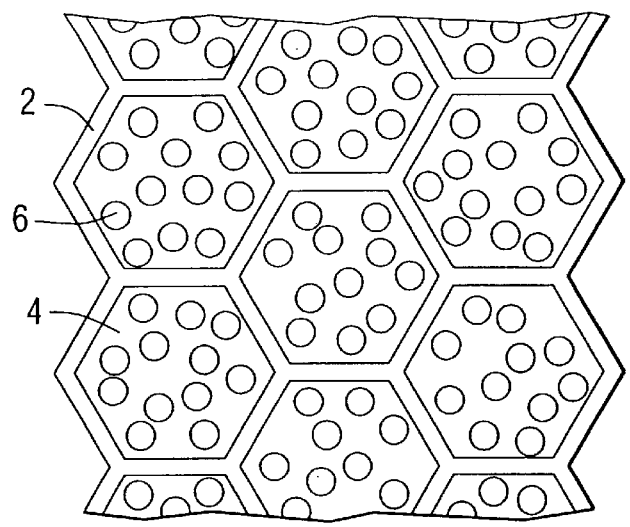
FIG. 1 is a partially schematic plan view of a composite thermal barrier coating in accordance with an embodiment of the present invention.

FIG. 1 is a partially schematic plan view of a composite thermal barrier coating of the present invention. The composite thermal barrier coating includes a metal support structure 2 in the form of a honeycomb having open cells. A ceramic filler material including a ceramic matrix 4 with hollow ceramic particles 6 contained therein fills the cells of the honeycomb 2. Although a honeycomb support structure 2 is shown in FIG. 1, other geometries which include open cells may be used in accordance with the present invention.

The cells of the honeycomb 2 preferably have widths of from about 1 to about 7 mm. The wall thickness of the honeycomb 2 is preferably from about 0.1 to about 0.5 mm. The honeycomb 2 preferably comprises at least one metal, for example, an iron based oxide dispersion strengthened (ODS) alloy such as PM2000 or a high temperature nickel superalloy such as Nimonic 115 or Inconel 706. PM2000 comprises about 20 weight percent Cr, 5.5 weight percent Al, 0.5 weight percent Ti, 0.5 weight percent $Y_2O_3$, and the balance Fe. Nimonic 115 comprises about 15 weight percent Cr, 15 weight percent Co, 5 weight percent Al, 4 weight percent Mo, 4 weight percent Ti, 1 weight percent Fe, 0.2 weight percent C, 0.04 weight percent Zr, and the balance Ni. Inconel 706 comprises about 37.5 weight percent Fe, 16 weight percent Cr, 2.9 weight percent Co, 1.75 weight percent Ti, 0.2 weight percent Al, 0.03 weight percent C, and the balance Ni.

The walls of the honeycomb 2 preferably include an oxide surface coating having a thickness of from about 0.005 to about 5 microns. The oxide surface coating may comprise metal oxides such alumina, titania, yttria and other stable oxides associated with the composition of the honeycomb material.

The ceramic matrix 4 of the ceramic filler material preferably comprises at least one phosphate such as monoaluminum phosphate, yttrium phosphate, lanthanum phosphate, boron phosphate, and other refractory phosphates or non phosphate binders or the like. The ceramic matrix 4 may also include ceramic filler powder such as mullite, alumina, ceria, zirconia and the like. The optional ceramic filler powder preferably has an average particle size of from about 1 to about 100 microns.

As shown in FIG. 1, the hollow ceramic particles 6 are preferably spherical and comprise zirconia, alumina, mullite, ceria YAG or the like. The hollow ceramic spheres 6 preferably have an average size of from about 0.2 to about 1.5 mm.

Figure 2:
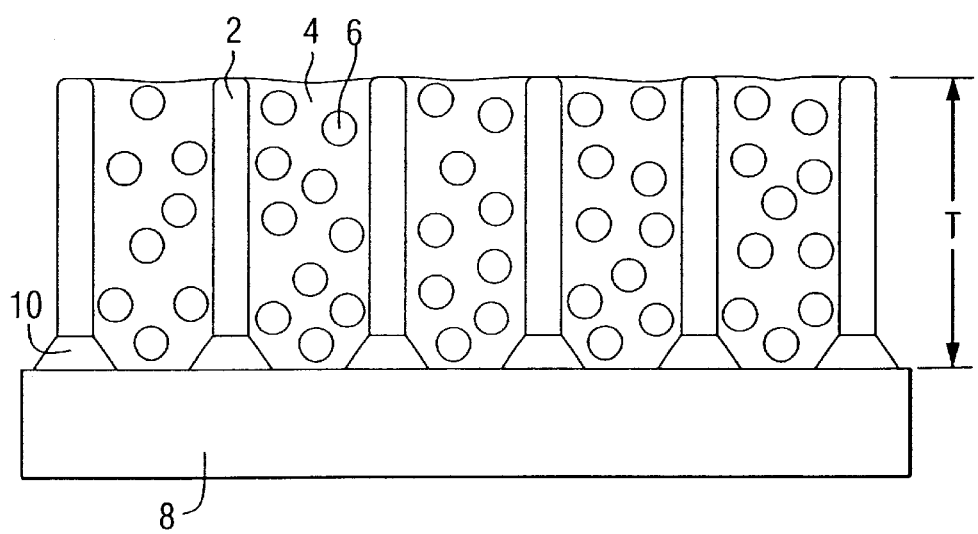
FIG. 2 is a partially schematic side sectional view of a composite thermal barrier coating in accordance with an embodiment of the present invention.

FIG. 2 is a partially schematic side sectional view of a composite thermal barrier coating in accordance with an embodiment of the present invention. The honeycomb support structure 2, ceramic matrix 4 and hollow ceramic particles 6 are secured to a metal substrate 8 which may comprise an alloy such any nickel based superalloy, cobalt based superalloy, iron based superalloy, ODS alloys or intermetallic materials. A braze material 10 is preferably used to secure the composite coating to the substrate 8. The braze material 10 may comprise a material such AMS 4738 or MBF100 or the like. Although in the embodiment of FIG. 2 a braze 10 is used to secure the composite thermal barrier coating to the substrate 8, any other suitable means of securing the coating to the substrate may be used. In a preferred embodiment, the metal substrate 8 comprises a component of a combustion turbine, such as a ring seal segment or the like.

For many applications, the thickness T of the composite thermal barrier coating, including the metal support structure and the ceramic filler material, is preferably from about 1 to about 6 mm, more preferably from about 2 to about 4 mm. However, the thickness can be varied depending upon the specific heat transfer conditions for each application.

Figure 3:
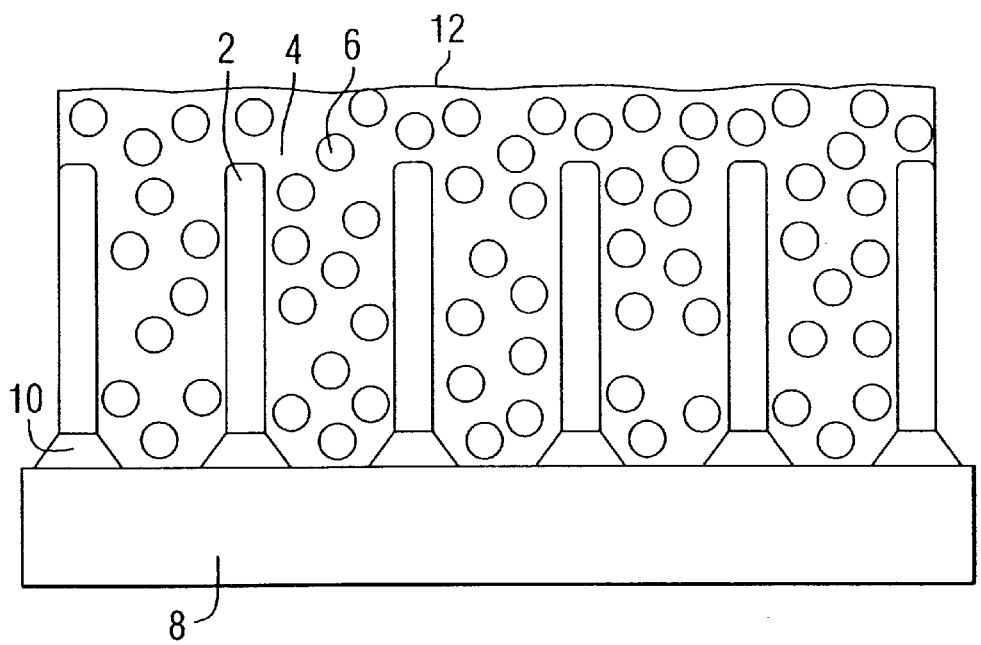
FIG. 3 is a partially schematic side sectional view of a composite thermal barrier coating in accordance with another embodiment of the present invention.

In the embodiment shown in FIG. 2, the ceramic filler material 4,6 substantially fills the cells of the honeycomb 2. In an alternative embodiment shown in FIG. 3, an additional amount of the ceramic filler material is provided as an overlayer 12 covering the honeycomb 2. In the embodiment shown in FIG. 3, the overlayer 12 is of substantially the same composition as the ceramic filler material 4,6 which fills the cells of the honeycomb 2. Alternatively, the overlayer 12 may be provided as a different composition. The thickness of the overlayer 12 is preferably from about 0.5 to about 2 mm and is generally proportional to the thickness of the honeycomb beneath.

Figure 4:
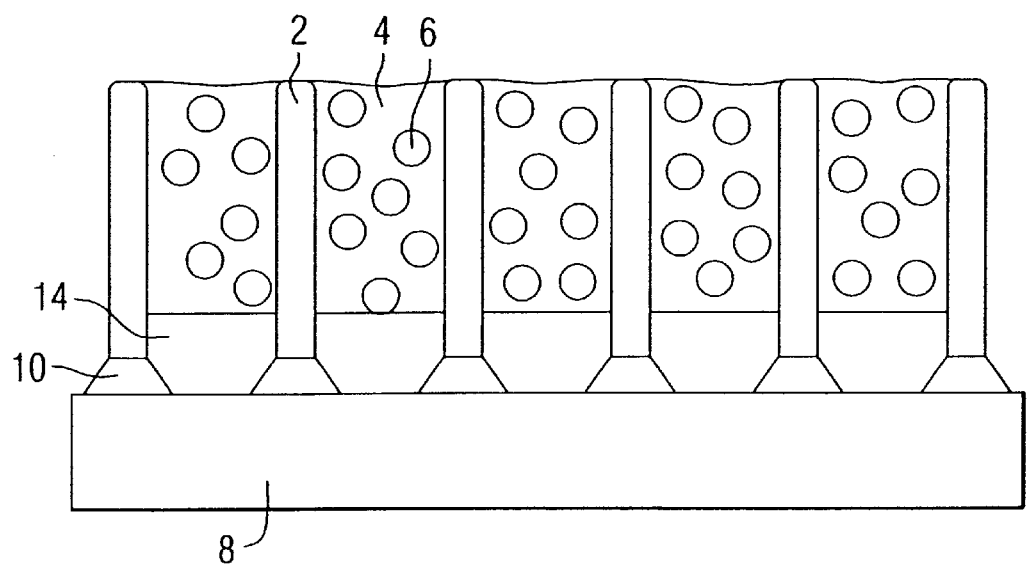
FIG. 4 is a partially schematic side sectional view of a composite thermal barrier coating in accordance with a further embodiment of the present invention.

FIG. 4 illustrates another embodiment of the present invention in which an intermediate layer 14 is provided between the substrate 8 and the ceramic filler material 4,6. In this embodiment, the intermediate layer 14 may comprise a void or a low density filler material such as a fibrous insulation or the like. The intermediate layer provides additional thermal insulation to the substrate material and may also contribute to increased compliance of the coating. The thickness of the intermediate layer 14 preferably ranges from about 0.5 to about 1.5 mm.

In accordance with the present invention, the composite thermal barrier coating is capable of operating in heat fluxes comparable to conventional thin APS thermal barrier coatings ($1-2\times10^6$ W/m$^2$). However, its benefit lies in the ability to reduce these heat fluxes by an order-of-magnitude via the increased thickness capability with respect to conventional TBCs. Cooling requirements are reduced correspondingly, thereby improving engine thermodynamic efficiency.

The composite thermal barrier coating preferably has particle erosion resistance which is equivalent or superior to conventional TBCs applied by thermal spraying. Erosion rates measured for a baseline version of the present system are compared below to conventional TBCs and conventional abradable coatings—applied by thermal spraying.

TABLE 1

Steady-State Erosion Rates for Back-Filled Honeycomb Thermal Barrier Coating

| Test Conditions | |
|---|---|
| Particle size | 27 microns |
| Particle Type | $Al_2O_3$ |
| Impact Velocity | 900 ft/s |
| Impingement angle | 15° |
| Test Temperature | 2350° F. |

| Test Results | | |
|---|---|---|
| Present Invention | Conventional TBC | Conventional Abradable Coating |
| 3.2 | 4.6–8.6 | 50–60 |
| g/kg (grams target lost / kilogram erosive media impacting) | | |

The present invention is also useful as an abradable coating for turbine blade tip sealing and other high temperature sealing applications. The measure of abradability of the baseline version is shown below on the basis of volume wear ratio (VWR). The abradability is comparable to that of conventional abradable coatings applied by thermal spray. The advantages offered by the present invention are: mechanical integrity due to the metallurgical bond to the substrate and the compliance offered by the honeycomb; and superior erosion resistance, e.g., greater than ten times better than conventional coatings.

TABLE 2

VWR Abradability Comparison of Present Invention vs. Conventional Abradable Coating

| Contacting blade condition | Present Invention | Conventional Abradable (APS-YSZ) |
|---|---|---|
| Untreated blade tips | 2 | 2.5 |
| CBN-coated blades tips | 15–40 | 250 |

* VWR = seal wear volume / blade tip wear volume
Note: The baseline version of the present invention was not optimized for abradability.

In accordance with a preferred embodiment of the present invention, the honeycomb may be brazed to the surface of the metal substrate using conventional high temperature braze foils or powders such as MBF 100, a cobalt based braze for iron based ODS alloys or Nicrobraze 135 for nickel superalloys. MBF 100 comprises about 21 weight percent Cr, 4.5 weight percent W, 2.15 weight percent B, 1.6 weight percent Si, and the balance Co. Nicrobraze 135 comprises about 3.5 weight percent Si, 1.9 weight percent B, 0.06 weight percent C, and the balance Ni. Brazing is preferably carried out in a vacuum furnace at a temperature of from about 900 to about 1,200° C. for a time of from about 15 to about 120 minutes.

After the honeycomb has been brazed to the surface of the metal substrate it is preferably partially oxidized to form an oxide coating on the honeycomb surface in order to aid bonding of the ceramic filler material. Partial oxidation of the surface of the honeycomb can be achieved by post braze heat treatment in air or during the brazing cycle if the vacuum is controlled to approximately $10^{-4}$ Torr.

The cells of the honeycomb are then at least partially filled with a flowable ceramic filler material comprising the hollow ceramic particles and the binder material, followed by heating the flowable ceramic filler material to form an interconnecting ceramic matrix in which the hollow ceramic particles are embedded. The flowable ceramic filler material preferably comprises the hollow ceramic particles and a matrix-forming binder material dispersed in a solvent. The solvent used for forming the phosphate binder solution is water. The solvent preferably comprises from about 30 to about 60 weight percent of the flowable ceramic material. Alternatively, the flowable ceramic filler material may be provided in powder form without a solvent. The flowable ceramic filler material is preferably packed into the open cells of the honeycomb using a combination of agitation and manually assisted packing using pushrods to force pack the honeycomb cells ensuring complete filling. Alternate packing methods such as vacuum infiltration, metered doctor blading and similar high volume production methods may also be used.

After the cells of the honeycomb support structure are filled with the flowable ceramic filler material, the material may be dried in order to substantially remove any solvent. Suitable drying temperatures range from about 60 to about 120° C.

After the filling and optional drying steps, the flowable ceramic filler material is heated, preferably by firing at a temperature of from about 700 to about 900° C., for a time of from about 60 to about 240 minutes. The firing temperature and time parameters are preferably controlled in order to form the desired interconnecting ceramic matrix embedding the hollow ceramic particles. Upon firing, the ceramic matrix preferably comprises an interconnected skeleton which binds the hollow ceramic particles together. The resultant ceramic matrix preferably comprises oxide filler particles bonded by a network of aluminum phosphate bridging bonds In a preferred method, a flowable green body of phosphate based ceramic filler containing monoaluminum phosphate solution, ceramic filler powder (such a mullite, alumina, ceria or zirconia) and hollow ceramic spheres in a preferred size range of from about 0.2 to about 1.5 mm is applied into the honeycomb until it comes into contact with the substrate base. The green formed system is then dried to remove remaining water and subsequently fired to form a refractory, insulative ceramic filler that fills the honeycomb cells. The ceramic filler material acts as a thermal protection coating, an abradable coating, and an erosion resistant coating at temperatures up to about 1,100° C. or higher. A ceramic overcoating, such as a phosphate based overcoating of similar composition to the backfilled honeycomb ceramic filler material or an alternative ceramic coating such as air plasma sprayed or PVD, may optionally be applied.

The phosphate binder may bond to the oxide scale both at the substrate base and on the honeycomb walls. Due to mismatches in expansion coefficients, some ceramic surface cracking may occur, but the bonding and mechanical anchoring to the honeycomb is sufficient to retain the ceramic filler material within the hexagonal cells of the honeycomb. Intercellular locking may also be achieved by introducing holes into the honeycomb cell walls to further encourage mechanical interlocking. Furthermore, the honeycomb may be shaped at an angle that is not perpendicular to the surface of the substrate in order to improve composite thermal behavior and to increase mechanical adhesion.

To improve bonding to the substrate base, a plasma sprayed coating such as alumina or mullite may be applied to the metallic materials prior to deposition of the ceramic filler material. After firing the coating may optionally be finish machined to the desired thickness. The coating may be back-filled with a phosphate bond filler and refined if smoother finishes are required.

The following example is intended to illustrate various aspects of the present invention, and is not intended to limit the scope of the invention.

EXAMPLE

A specific combination of the following materials can be used to manufacture the coating system: X-45 cobalt based superalloy substrate material; PM2000 Honeycomb (125 microns wall thickness, 4 mm depth and 3.56 mm cell size); MBF 100 Braze Foil; 50% aqueous solution of monoaluminum phosphate; KCM73 sintered mullite powder (25 microns particle size) and alumina hollow spheres (1.6 g/cc bulk density, sphere diameter 0.3 to 1.2 mm). The honeycomb is brazed to the surface substrate using established vacuum brazing techniques. The MBF 100 braze foil is cut to shape and accurately placed underneath the honeycomb part and then positioned onto the substrate. The honeycomb/foil assembly is then resistance brazed in air to the substrate to tack the honeycomb into position. The tacking of the honeycomb to the substrate is to prevent the honeycomb from springing back and away from the substrate surface during the brazing cycle. Vacuum brazing is then carried out to the schedule listed in Table 3.

TABLE 3

| Ramp Rate | Temperature (± 4° C.) | Time |
| --- | --- | --- |
| 4° C./min | 1066° C. | hold for 10 mins |
| 4° C./min | 1195° C. | hold for 15 mins |
| furnace cool | 1038° C. | |
| Force cool using $N_2$ gas | 93° C. | |

The next stage of the process involves preparation of the slurry that will be used to bond the spheres into the honeycomb cells. The slurry consists of 49.3 weight percent aqueous solution of monoaluminum phosphate and 50.7 weight percent KCM73 mullite powder. The two constituents are mixed in an inert container until the powder is thoroughly dispersed into the aqueous solution. The solution is then left for a minimum of 24 hours to dissolve any metallic impurities from the powder.

The slurry is then applied to the surface of the brazed honeycomb to form a dust coating on the surface of the cell walls. This is applied using an air spray gun at approximately 20 psi pressure. The dust coating serves as a weak adhesive to contain the ceramic hollow spheres. The next stage of the process involves the application of the spheres into the wetted honeycomb cells. Enough spheres are administered to fill approximately one-third to one-half the volume of the cells. Application of the spheres is not necessarily a metered process. A pepper pot approach can be applied with reasonable care and attention paid to the amount going into the individual cells. After the correct amount of spheres are applied, a stiff bristled tamping brush is then used to force pack the spheres into the cells ensuring no gaps or air pockets are left in the partially packed cells. After tamping has been completed, the aforementioned process is repeated until the packing cells are completely filled with well packed spheres. The slurry spraying and sphere packing needs to be repeated once or twice to achieve filled spheres. When the spheres are filled, a saturating coating of slurry is applied to ensure the filling of any remaining spaces with the soaking action of the slurry. Parts of the substrate may be masked off in order to avoid contact with the slurry if needed.

After the wet filling operation has been completed, the wet green body is left to dry in air at ambient temperature for between 24 to 48 hours. It is then subjected to the following thermal treatment in air to form the refractory, bonded body to which the invention discussed herein pertains.

TABLE 4

| Start Temp (° C.) | Ramp Rate (° C./min) | Hold Temperature (° C.) | Dwell Time (Hours) |
|---|---|---|---|
| 80 | — | 80 | 48 |
| 80 | 1 | 130 | 1 |
| 130 | 1 | 800 | 4 |
| 800 | 10 | ambient | — |

Following firing the surface of the backfilled honeycomb may be machined to specified tolerances using diamond grinding media and water as a lubricant.

Figure 5:
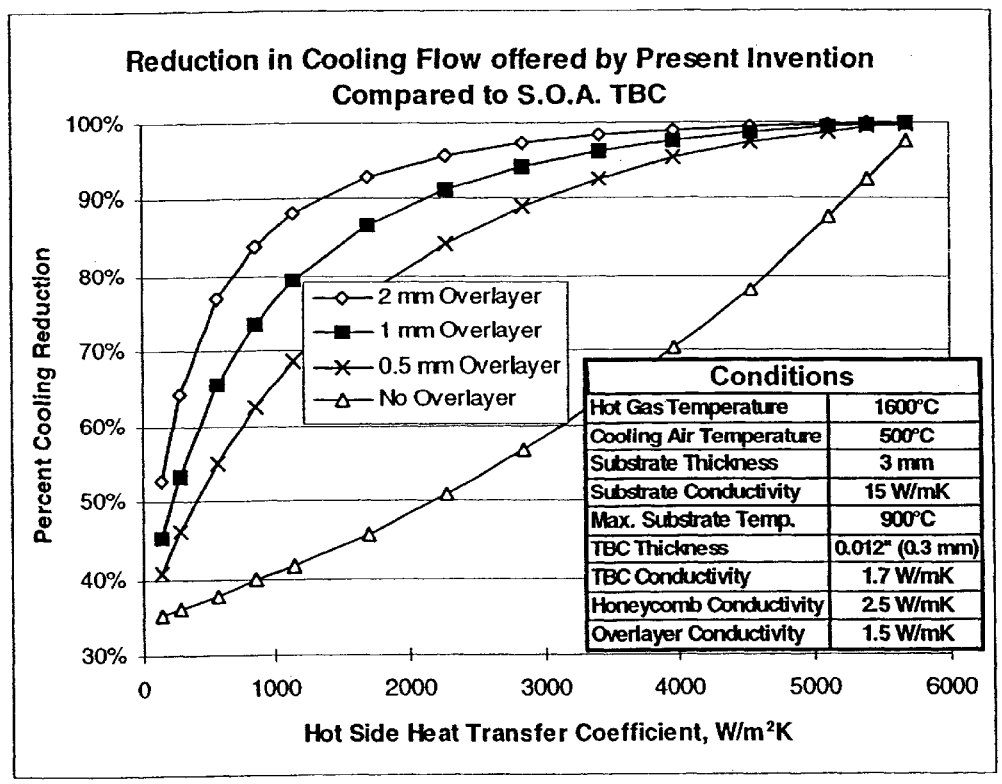
FIG. 5 is a graph illustrating improved heat transfer characteristics of a composite thermal barrier coating material of the present invention in comparison with conventional thermal barrier coating materials.

Thermal modeling of the present system using a one-dimensional heat transfer model shows the benefit of the thick honeycomb type coatings in comparison with conventional thin APS type coatings. A conductivity of 2.5 W/mK is used for the back-filled honeycomb, as derived from the relative volume fractions of ceramic filler and metallic honeycomb. FIG. 5 shows the relative reduction in cooling air allowed by the present system compared to conventional TBC coatings. Heat transfer conditions used (shown in the figure) are representative of advanced gas turbine operating conditions. The curves show that, for a wide range of hot side heat transfer conditions (spanning the range of hot turbine components from combustors to vanes), the present system offers significant performance benefit (from 30% to >90% cooling air savings). These benefits are possible with or without overlayer coatings. However, with reasonable overlayer coating thicknesses, the benefit is increased substantially at the lower range of heat transfer conditions.

The present coating system offers a unique alternative to conventional thermal barrier coatings such as APS and EBPVD for metallic substrates. The honeycomb provides the mechanical support necessary to retain the ceramic as a thick layer. The components of the system, the honeycomb, the braze material and the ceramic constituents, are all relatively low cost and require no expensive manufacturing techniques, making this process a relatively low cost one.

The present system offers an abradable, erosion resistant and thermally insulating ceramic coating of increased thickness which provides increased temperature protection for metal parts in land based gas turbines. The system can be used at gas path temperatures of 1,300° C. and higher on metallic components, allowing land based turbine ring seal segments and the like to function with reduced cooling air and longer life. The ceramic filler material provides excellent erosion resistance to particle erosion, but provides preferred wear in the case of metal/ceramic rubbing, e.g., in the case of blade tip/ring seal segment rubbing. Anchoring the ceramic system to the metal substrates using a metallic honeycomb provides compliance in the system to reduce localized loading due to the different thermomechanical properties of the ceramic filler material and the substrate. This combination of materials provides new and novel thermal barrier materials, both in terms of temperature capability and allowable temperature drop, with improved durability and wear properties.

The coating system can be applied to substantially any metallic surface in a combustion turbine that requires thermal protection to provide survivability of the metal. It provides the capability to apply very thick surface coatings to allow for very high gas path temperatures and greatly reduced component cooling air. In addition to ring seal segments, transitions and combustors, the system may be applied to planar hot gas washed surfaces of components, such as the inner and outer shrouds of vane segments.

Whereas particular embodiments of this invention have been described above for purposes of illustration, it will be evident to those skilled in the art that numerous variations of the details of the present invention may be made without departing from the invention as defined in the appended claims.

What is claimed is:

1. An abradable composite thermal barrier coating comprising:
   a metal substrate;
   a metal support structure comprising open cells secured to the substrate; and
   a ceramic filler material at least partially inside the cells of the metal support structure comprising hollow ceramic particles having an average size of greater than 0.2 mm in a ceramic matrix.

2. The composite thermal barrier coating of claim 1, wherein the open cells of the metal support structure are in the form of a honeycomb.

3. The composite thermal barrier coating of claim 2, wherein the honeycomb comprises an iron based alloy or a nickel based alloy.

4. The composite thermal barrier coating of claim 2, further comprising an oxide surface coating over at least a portion of the honeycomb.

5. The composite thermal barrier coating of claim 4, wherein the oxide surface coating comprises an oxide of at least one metal selected from the group comprising titanium, aluminum and yttrium.

6. The composite thermal barrier coating of claim 4, wherein the oxide surface coating has a thickness of from about 0.005 to about 5 microns.

7. The composite thermal barrier coating of claim 1, wherein the hollow ceramic particles are substantially spherical.

8. The composite thermal barrier coating of claim 7, wherein the hollow ceramic particles comprise at least one material selected from the group comprising zirconia, alumina, mullite and ceria.

9. The composite thermal barrier coating of claim 7, wherein the hollow ceramic particles have an average size of up to about 1.5 mm.

10. The composite thermal barrier coating of claim 1, wherein the ceramic matrix comprises at least one phosphate selected from the group comprising monoaluminum phosphate, yttrium phosphate, lanthanum phosphate and boron phosphate.

11. The composite thermal barrier coating of claim 10, wherein the ceramic matrix further comprises at least one ceramic filler powder selected from the group comprising mullite, alumina, ceria and zirconia.

12. The composite thermal barrier coating of claim 11, wherein the ceramic filler powder has an average particle size of from about 1 to about 100 microns.

13. The composite thermal barrier coating of claim 1, wherein the metal substrate comprises at least one alloy selected from the group comprising nickel based superalloys, cobalt based superalloys, iron based superalloys, oxide dispersion strengthened alloys and intermetallics.

14. The composite thermal barrier coating of claim 1, wherein the metal substrate comprises a component of a combustion turbine.

15. The composite thermal barrier coating of claim 14, wherein the metal substrate comprises a ring seal segment, combustor, transition, inner platform, or outer platform.

16. The composite thermal barrier coating of claim 1, wherein the metal support structure is secured to the metal substrate by brazing.

17. The composite thermal barrier coating of claim 1, wherein the total thickness of the metal support structure and the ceramic filler material is from about 1 to about 6 mm.

18. The composite thermal barrier coating of claim 1, wherein the total thickness of the metal support structure and the ceramic filler material is from about 2 to about 4 mm.

19. The composite thermal barrier coating of claim 1, wherein the metal support structure comprises a honeycomb having open cells, and the ceramic filler material substantially fills the cells of the honeycomb.

20. The composite thermal barrier coating of claim 1, wherein the metal support structure comprises a honeycomb having open cells, and the ceramic filler material partially fills the cells of the honeycomb.

21. The composite thermal barrier coating of claim 20, further comprising at least one intermediate layer of material inside the cells of the honeycomb separating the metal substrate and the ceramic filler material.

22. The composite thermal barrier coating of claim 21, wherein the at least one intermediate layer has a thickness of from about 0.5 to about 1.5 mm.

23. The composite thermal barrier coating of claim 1, wherein the metal support structure comprises a honeycomb having open cells and the ceramic filler material extends from the cells of the honeycomb to form an overlayer.

24. The composite thermal barrier coating of claim 23, wherein the overlayer has a thickness of from about 0.5 to about 2 mm.

25. The composite thermal barrier coating of claim 1, further comprising at least one ceramic overlayer at least partially covering the metal support structure and the ceramic filler material.

26. The composite thermal barrier coating of claim 1, wherein the composite thermal barrier coating is capable of operating at a temperature of at least about 1,300° C.

27. A method of making an abradable composite thermal barrier coating comprising:
   securing a metal support structure having open cells to a metal substrate;
   at least partially filling the cells of the metal support structure with a flowable ceramic filler material comprising hollow ceramic particles having an average size of greater than 0.2 mm and a binder material; and
   heating the flowable ceramic filler material to form a ceramic matrix connecting the hollow ceramic particles.

28. The method of claim 27, wherein the metal support structure comprises a honeycomb.

29. The method of claim 28, further comprising providing an oxide surface coating over at least a portion of the honeycomb.

30. The method of claim 27, wherein the ceramic matrix further comprises at least one ceramic filler powder.

31. The method of claim 27, further comprising securing the metal support structure to the metal substrate by brazing.

32. The method of claim 27, wherein the metal support structure comprises a honeycomb, and the ceramic filler material substantially fills the cells of the honeycomb.

33. The method of claim 27, wherein the metal support structure comprises a honeycomb, and the ceramic filler material partially fills the cells of the honeycomb.

34. The method of claim 33, further comprising at least one intermediate layer of material inside the cells of the honeycomb separating the metal substrate and the ceramic filler material.

35. The method of claim 27, further comprising providing at least one ceramic layer at least partially covering the metal support structure and the ceramic filler material.

36. The method of claim 27, wherein the flowable ceramic filler material comprises the hollow ceramic particles and the binder material dispersed in a solvent.

37. The method of claim 36, wherein the solvent comprises water.

38. The method of claim 36, wherein the solvent comprises from about 30 to about 60 weight percent of the flowable ceramic filler material.

39. The method of claim 27, further comprising drying the flowable ceramic filler material prior to the heating thereof.

40. The method of claim 27, wherein the flowable ceramic filler material is heated by firing at a temperature of from about 700 to about 900° C., for a time of from about 60 to about 240 minutes.

41. The method of claim 27, wherein the flowable ceramic filler material is heated at a sufficient temperature and for a sufficient time to form a ceramic matrix connecting the hollow ceramic particles.

42. The method of claim 41, wherein the ceramic matrix comprises an interconnected skeleton.

43. The method of claim 41, wherein the ceramic matrix comprises at least one phosphate.

* * * * *